(12) United States Patent
Bak

(10) Patent No.: US 12,490,893 B2
(45) Date of Patent: Dec. 9, 2025

(54) LIGHT GUIDING ASSEMBLY FOR LIGHT EXPOSURE OF A MEDICAL TUBE

(71) Applicant: UV CLINICAL A/S, Kongens Lyngby (DK)

(72) Inventor: Jimmy Bak, Greve (DK)

(73) Assignee: UV CLINICAL A/S, Kongens Lyngby (DK)

( * ) Notice: Subject to any disclaimer, the term of this patent is extended or adjusted under 35 U.S.C. 154(b) by 966 days.

(21) Appl. No.: 17/634,596

(22) PCT Filed: Aug. 17, 2020

(86) PCT No.: PCT/EP2020/072992
§ 371 (c)(1),
(2) Date: Feb. 11, 2022

(87) PCT Pub. No.: WO2021/028595
PCT Pub. Date: Feb. 18, 2021

(65) Prior Publication Data
US 2022/0322924 A1    Oct. 13, 2022

(30) Foreign Application Priority Data

Aug. 15, 2019    (EP) .................................. 19191931

(51) Int. Cl.
*A61B 1/12*      (2006.01)
*A61L 2/10*      (2006.01)
*G02B 6/42*      (2006.01)

(52) U.S. Cl.
CPC ................ *A61B 1/121* (2013.01); *A61L 2/10* (2013.01); *G02B 6/4298* (2013.01)

(58) Field of Classification Search
CPC ................................. A61L 2/10; G02B 6/4298
See application file for complete search history.

(56) References Cited

U.S. PATENT DOCUMENTS 3,995,934 A    12/1976    Nath
4,045,119 A    8/1977     Eastgate
5,896,483 A    4/1999     Wojcik et al.

FOREIGN PATENT DOCUMENTS

JP        5730802         2/1982
WO        2013/023666 A1  2/2013
WO        2015/066238 A2  5/2015
WO        2015/066238 A3  7/2015

*Primary Examiner* — Timothy C Cleveland
(74) *Attorney, Agent, or Firm* — DINSMORE & SHOHL LLP

(57) ABSTRACT

The present disclosure relates to a light guiding assembly for light exposure of the interior of medical tubes, e.g. for disinfecting said tubes using ultraviolet-C (UVC) light. The light guiding assembly preferably comprises a coupling element, which in the proximal end is connectable to a light source assembly and in the distal end is connectable to a light guiding element. Said light guiding element preferably comprises a liquid filled polymer tube, a distal closure at the distal end of said tube, and a proximal closure comprising a gasket with overflow functionality at the proximal end of said tube. The present disclosure further relates to a method for filling said light guiding assembly.

10 Claims, 10 Drawing Sheets

LIGHT GUIDING ASSEMBLY FOR LIGHT EXPOSURE OF A MEDICAL TUBE

CROSS-REFERENCE TO RELATED APPLICATIONS

This application is the U.S. National Stage of PCT/EP2020/072992 filed Aug. 17, 2020, which claims priority to European Patent Application No. 19191931.5 filed Aug. 15, 2019, the content of both of which are incorporated herein by reference in their entirety

FIELD OF THE INVENTION

The present disclosure relates to a light guiding assembly for disinfecting medical tubes and medical devices, e.g. using ultraviolet-C (UVC) light distributed by a liquid filled tube that can be inserted in said medical tubes. The present disclosure further relates to at least one method for filling such a tube with a liquid.

BACKGROUND OF INVENTION

Central venous access might be needed for extended periods of time; patients can be colonized with hospital-acquired organisms; and the catheter can be manipulated multiple times per day for the administration of fluids, drugs, and blood products. Moreover, some catheters can be inserted in urgent situations, during which optimal attention to aseptic technique might not be feasible. Certain catheters (e.g. pulmonary artery catheters and peripheral arterial catheters) can be accessed multiple times per day for hemodynamic measurements or to obtain samples for laboratory analysis, augmenting the potential for contamination and subsequent clinical infection.

Respiratory circuits form a category of medical devices where keeping a sterile environment is a challenge. Due to the inherent moisture and warmth, respiratory circuits provide superb conditions for microbiological growth or colonization. Once colonization has started, the microbiological growth can easily spread to the patient, either airborne or through moisture condensation running down into the patient's lungs, thus risking infections and complications, often resulting in pneumonia.

The problem of respiratory circuit colonization is especially prevalent within breathing tubes. Studies have shown the health risks from colonization of biofilm in endotracheal tubes, which can be so extensive that the walls of the endotracheal tube become slimy and sticky. Due to the close proximity to the patient's lungs, any microbiological growth in a breathing tube can easily spread to the patient's lungs. Condensed moisture can run down the breathing tube, over the biofilm and into the patient's lungs. Additionally, chunks of the biofilm can actually fall off the breathing tube and into the patient's lungs.

Elongated light delivery systems emitting UV light from LEDs such as small diameter optical glass fibers and liquid light guides to disinfect the inside of medical devices, such as catheters, are known. For instance, liquid light guides are known from WO 2013/023666 by the same applicant, which is incorporated herein in its entirety. These elongated liquid light guides typically emit light continuously along the length of the guide and homogeneously around the circumference of the light guide. While liquid light guides are excellent for disinfecting the interior of medical devices, they lack a simple and practical solution for filling such a light guide with a liquid. Oftentimes, air bubbles are trapped inside the light guide, which results in a degraded performance of the device.

Accordingly, there is a need for a simple and practical method of filling a liquid filled light guide, which allows the guide to be completely filled with the liquid, i.e. without capturing any air bubbles.

Furthermore, the liquid light guides often have the issue of leaking liquid from the guide. Leakage of the liquid, e.g. an ionic solution, from the liquid light guide often results in contamination of the optical surfaces of the light source. This reduces the light transmittance and hence disinfection efficacy of the light guide. More importantly, a leakage from the liquid light guide sometimes creates an air space in the light guide, which often results in an abrupt loss of light by diffraction and consequently a decrease in the transmittance through the entire length of the light guide. In addition, in order to avoid cross-contamination when re-using the light source, no physical contact between the light source and the medical device is allowed.

Accordingly, there is a need for a solution, which overcomes the above-mentioned technical challenges, i.e. an easy-to-use and preferably disposable coupling means for coupling a light source to a liquid filled light guide, the coupling means preferably forming a leak-free connection between the light source and the liquid filled light guide.

Moreover, there is a need for a solution for interfacing a light guiding assembly to a medical device, which allows for an optimal coupling such that light from the light source can be transmitted into a small opening of the light guiding tube with a high efficacy.

Finally, there is a need for a light guiding assembly, wherein a majority of the components are disposable, i.e. they should preferably be inexpensive and made of disposable materials. This will ensure that a sterile device can be used every time.

SUMMARY OF INVENTION

The present disclosure addresses the above-mentioned challenges by disclosing a light guiding assembly for disinfecting or illuminating surfaces and lumens of tubular devices, typically medical devices. The light guiding assembly preferably comprises a light coupling element and a light guiding element. The light coupling element preferably comprises means for connecting a light source assembly hereto, means for connecting a light guiding element, and a window through which light from the light source can be transmitted. The light guiding element preferably comprises a liquid filled tube, a distal closure at the distal end of said tube, and a proximal closure comprising a gasket with overflow functionality at the proximal end of said tube. The parts are preferably predominantly made of polymer to be suitable for medical applications and for single-time use. In the preferred embodiment the liquid filled tube comprises an at least partly transparent tube wall.

Provided a light source is connected to the light guiding assembly, the assembly is suitable for disinfecting the lumen of a device, typically a medical device. In one embodiment of the present disclosure, a light source assembly is connected to the proximal end of the light coupling element and the light guiding element is connected to the distal end of said light coupling element. The light guiding element is preferably equipped with a coupling part, which after the light guiding element is inserted into the tube, is connectable to a coupling part of the medical tube. A suitable light source assembly typically comprises a light source, a lens and a transparent window. The emitted light from the light source is preferably transmitted to the liquid filled tube of the light guiding element via the light coupling element. The light coupling element is thus preferably placed between the light source assembly and the light guiding element. The light guiding assembly may then be connected to a tubular medical device via one or more connector/coupling parts. The light coupling element preferably comprises an optical window, through which the emitted light reaches the inlet portion of the light guiding element. The light may be transmitted through the light guiding element and preferably emitted radially through the transparent tube wall along a substantial length of the tube and into the device lumen and thereby expose the inner space of said device with ultraviolet light or light activating photo catalysts coated at the surfaces of the tubular device, similar to the device disclosed in WO 2013/023666.

The present disclosure further relates to a method of filling a tube for light exposure of the interior of medical tubes. In one embodiment of the present disclosure, said method comprises the steps of: closing the proximal end of the tube, e.g. by connecting the proximal end of the tube to a light coupling element; connecting the distal end of the tube to a liquid source; allowing a liquid to flow from said liquid source to the inside of the tube; allowing excess liquid to flow out of the tube through the proximal end; disconnecting the tube from the liquid source, once the inner of said tube is completely filled with the liquid; and closing the distal closure in the distal end of said tube, once the liquid source is removed from the distal end. Using this method, it is ensured that the entirety of the tube is filled with the liquid without capturing any air inside the tube. This is achieved by using a gasket with an overflow functionality, which allows excess liquid to flow out of the tube during filling of the tube. Thus, one may continue filling the tube until all potential air bubbles are removed and until the tube is completely filled with liquid. In this method, the distal end is closed with a connector part and a plug, both of which may be removed and discarded before the light guiding assembly is used, e.g. inside a medical device. Accordingly, the device may be filled with the liquid already before the customer receives it. Removing the connector and plug is quickly and easily done by the user prior to use.

In another embodiment of the present disclosure, the method of filling a tube for light exposure of medical tubes comprises the steps of: inserting through the proximal end of the tube a filling needle, said filling needle being in fluid connection with a liquid source; allowing a liquid to flow from the liquid source to the inside of the tube through the filling needle; removing the filling needle from the tube, once the inner of the tube is completely filled with the liquid; and closing the proximal end of the tube, e.g. by connecting the proximal end of the tube to a light coupling element. Similar to the aforementioned method, this method ensures that the entirety of the tube is filled with the liquid without capturing any air inside the tube. In this method, this is achieved using a filling needle that extends to the distal end of the tube, and preferably by keeping the filling needle submerged in liquid as it is slowly pulled towards the proximal end of the tube. In this embodiment of the present disclosure, the distal end of the tube is closed with a plug, typically a welded or etched polymer plug. Once the user receives the light guiding assembly, pre-filled with liquid, he/she may immediately use the device without removing a plug in the distal end.

The present disclosure presents a light coupling element that is capable of coupling a small and compact light source, such as an LED, with a small diameter lens system to a light guiding element that allows focusing and propagation of UV light. Oftentimes, small angular and axial deviations in the position between the focal point from the light source/lens system and the entrance of the light guiding element decrease the throughput and therefore the disinfection efficiency. The presently disclosed light guiding assembly solves this issue by disclosing means for coupling the light guiding assembly to a light source and coupling it to a medical device, while keeping the angles and distances in an optimal position. The present disclosure thus solves the problem of optically aligning the individual components. In case the elongated part of the light guiding element is an optical fiber, the diameter is typically very small. Accordingly, the requirements for optical alignment are of great importance. In case the elongated part of the light guiding element is a liquid filled light guide, the diameter is typically slightly larger but the requirements for a leak-free coupling part to the light source is indispensable.

One suitable application for the disclosed light guiding assembly is for disinfection of narrow medical tubes such as endotracheal tubes and venous catheters. Both types of light guiding systems may be inserted into larger diameter medical tubing. Germicidal light such as UVC light is then typically used to expose the inner lumen of the medical tube in a uniform manner. Light at other wavelengths may be used as well. As an example, medical tubing with photoactive coatings may be combined with a light source emitting light in the UVB, UVA and visible spectral region.

DESCRIPTION OF DRAWINGS

In FIG. 8 the setup is shown as assembled in the top part of FIG. 8 and disassembled in the bottom part of FIG. 8. The connector part 48 of the coupling element 30 is connected to the catheter adapter 80 which fits into the opening of the venous catheter 66 via a Luer connection with threaded engagement.

DETAILED DESCRIPTION OF THE INVENTION

The present disclosure relates to a light guiding assembly for light exposure of the inside of a medical tube, said assembly comprising a light guiding element and a light coupling element. The light guiding element typically comprises a liquid filled polymer tube, a distal closure at the distal end of said tube, and a proximal closure comprising a gasket with overflow functionality at the proximal end of said tube. The light coupling element typically comprises a window, a distal end configured for engagement with the proximal closure such that the gasket seals the liquid filled polymer tube, and a proximal end for engagement with a light source such that light can be guided into the liquid filled polymer tube.

Light Coupling Element

Figure 1A:
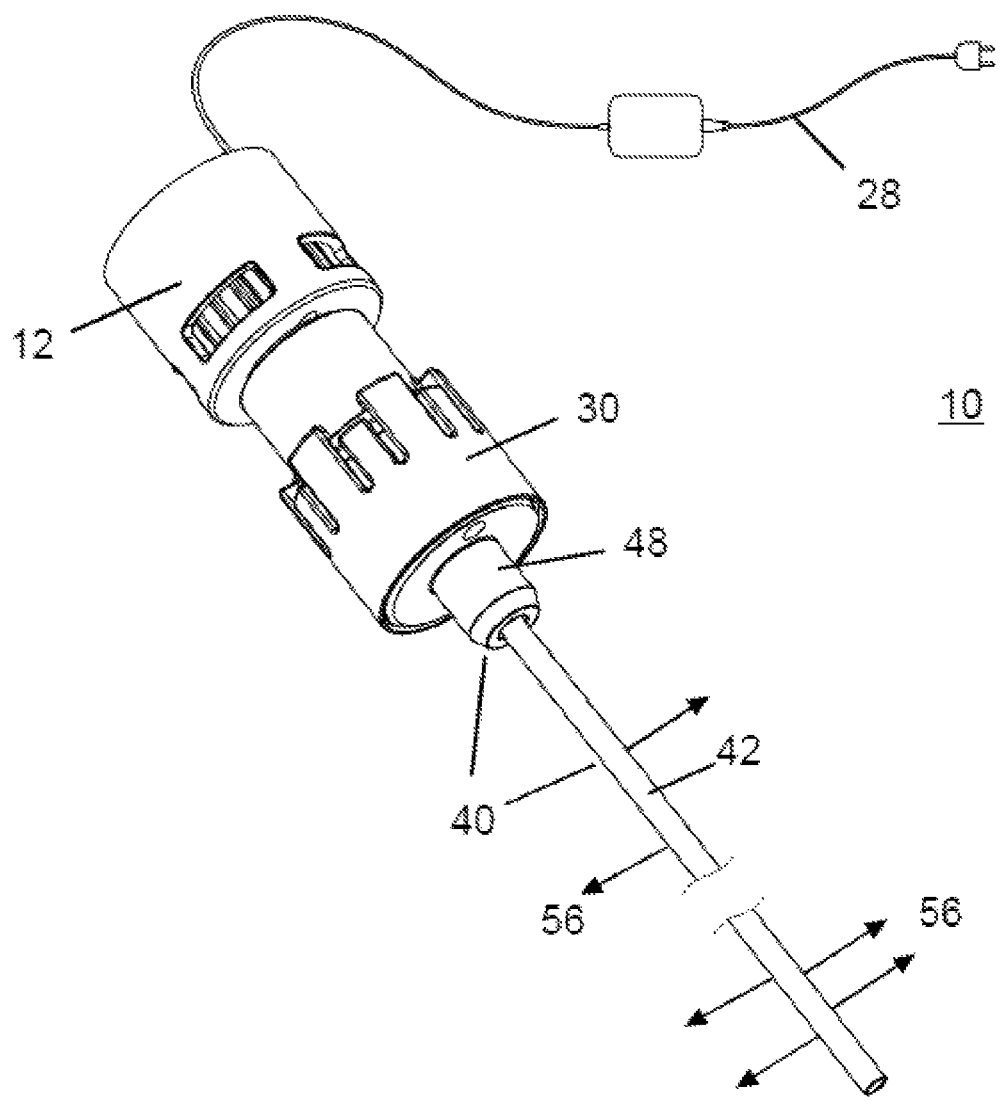
FIG. 1A shows a schematic view of a light guiding assembly according to one embodiment of the present disclosure. In this example, the light guiding assembly is connected to a light source assembly 12. In this embodiment, the light guiding assembly comprises a light guiding element 40 and a light coupling element 30. The connector part 48 may be manufactured to fit the connector part of an airway tube, or a Luer connector part of a venous catheter or other medical tubes. The light guiding element 40 preferably comprises a liquid filled polymer tube 42, wherein light propagates in the longitudinal direction. Simultaneous with the light propagation, a portion of the light is preferably emitted radially from the tube 42 along a substantial length of the tube. The light source is preferably powered electrically 28.
Figure 1B:
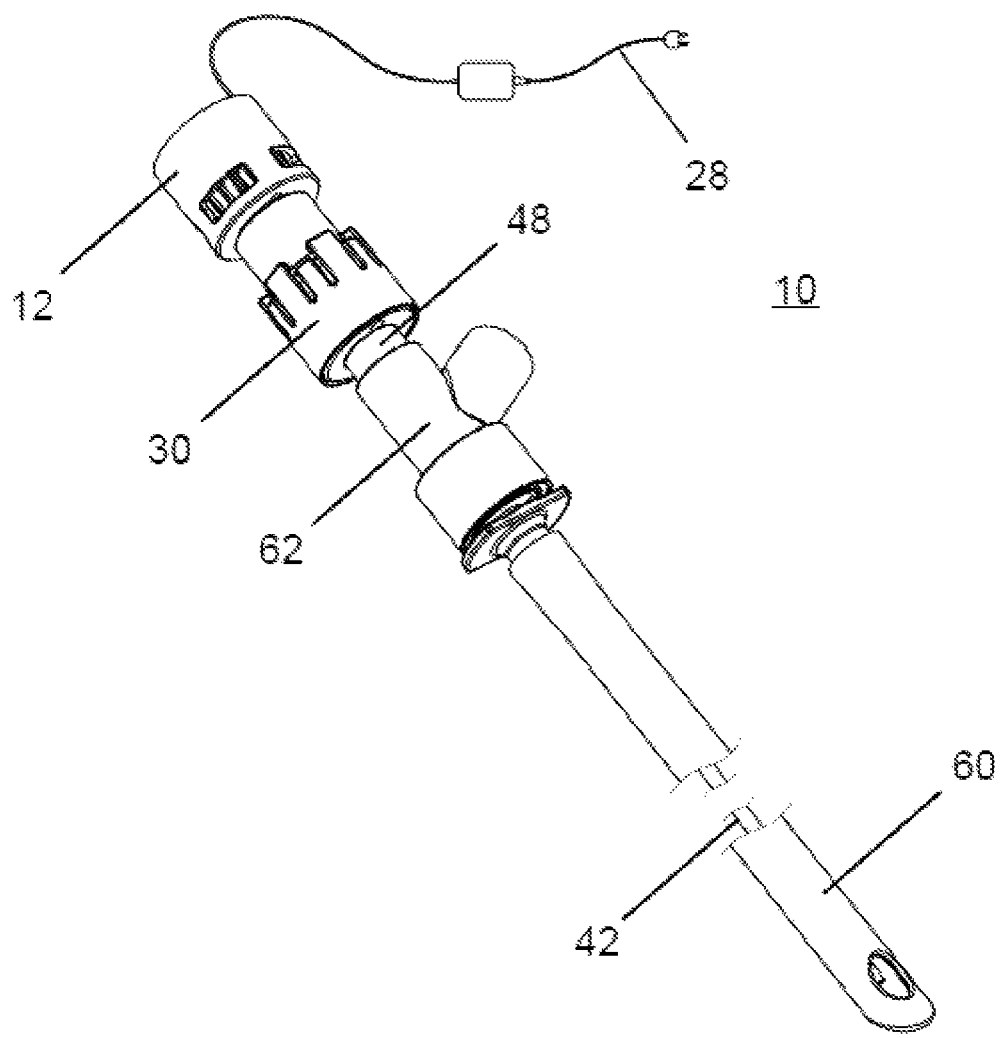
FIG. 1B shows a schematic view of an embodiment of the disclosed light guiding assembly, wherein the assembly is connected to and inserted in a medical device 60. The light source assembly 12 is connected to the light guiding assembly via the light coupling element 30. The medical device 60 is connected to the light guiding assembly via a medical device connector part 62, which fits to the connector part 48. In this embodiment, the two connector parts (48, 62) are secured to each other by friction by having the outer diameter of the connector part 48 approximately match the inner diameter of the medical device connector part 62. The liquid filled polymer tube 42 of the light guiding assembly may be inserted into the lumen of a medical tube part 60 and fastened via a connector part 48 on a medical device connector part. When connected, the light source can be switched to expose light radially from the liquid filled polymer tube 42 to the inner surface of the medical device 60. In this example, the medical tube 60 is an airway tube used for ventilating a patient. In another embodiment, the tube 42 could be inserted into a catheter or another medical tubing with a slight modification of the connector part 48.
Figure 2A:
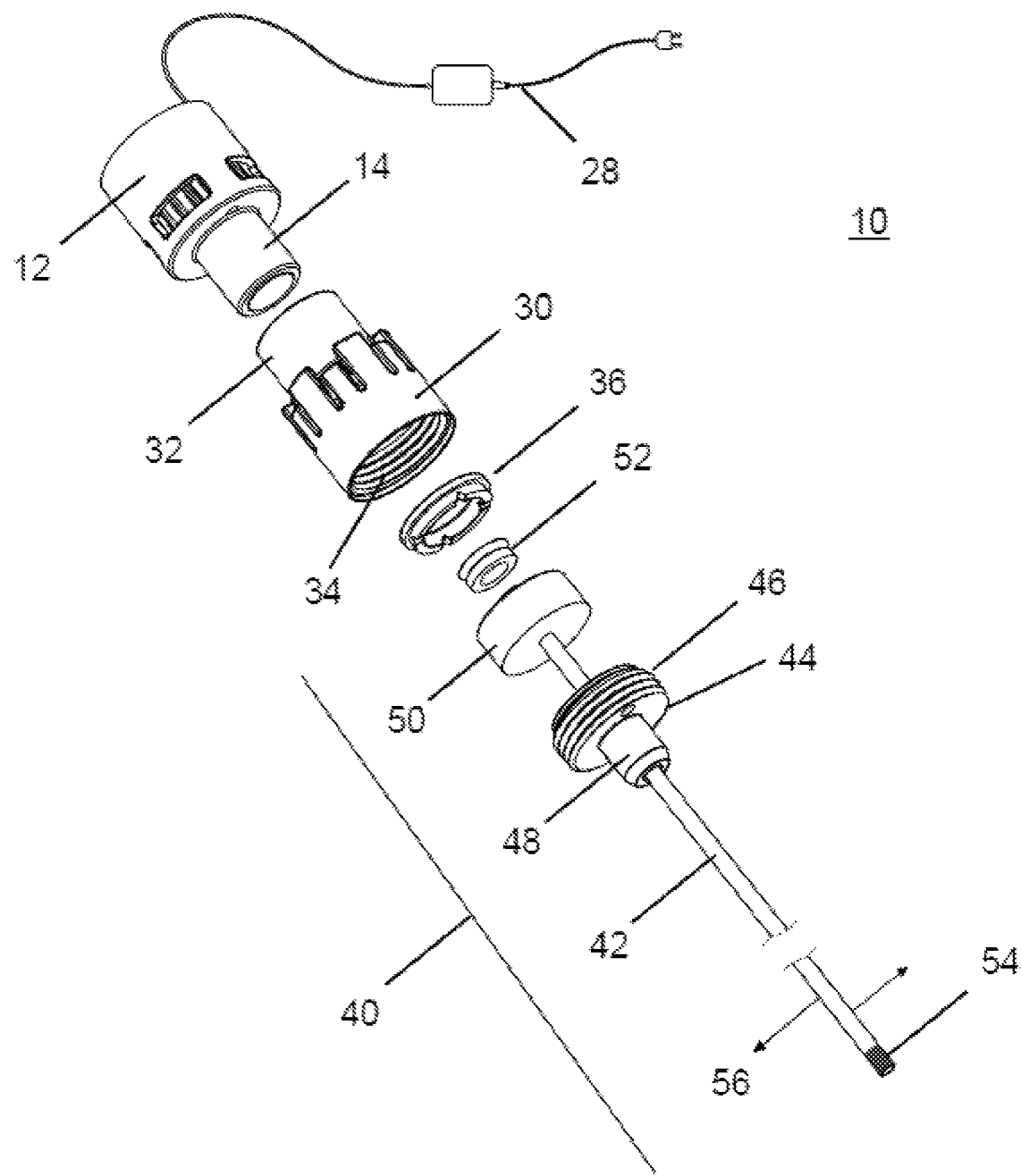
FIG. 2A is an exploded view of a light guiding assembly according to one embodiment of the present disclosure. In this embodiment, the light guiding assembly comprises a light coupling element 30 and a light guiding element 40. The light coupling element preferably comprises a housing 30, a connector part 32, and a polymer window 36. In this embodiment, the light coupling element is internally threaded on at least a part of the inner surface for engaging with the outer thread 46 of a connector part on a light guiding element.
Figure 2B:
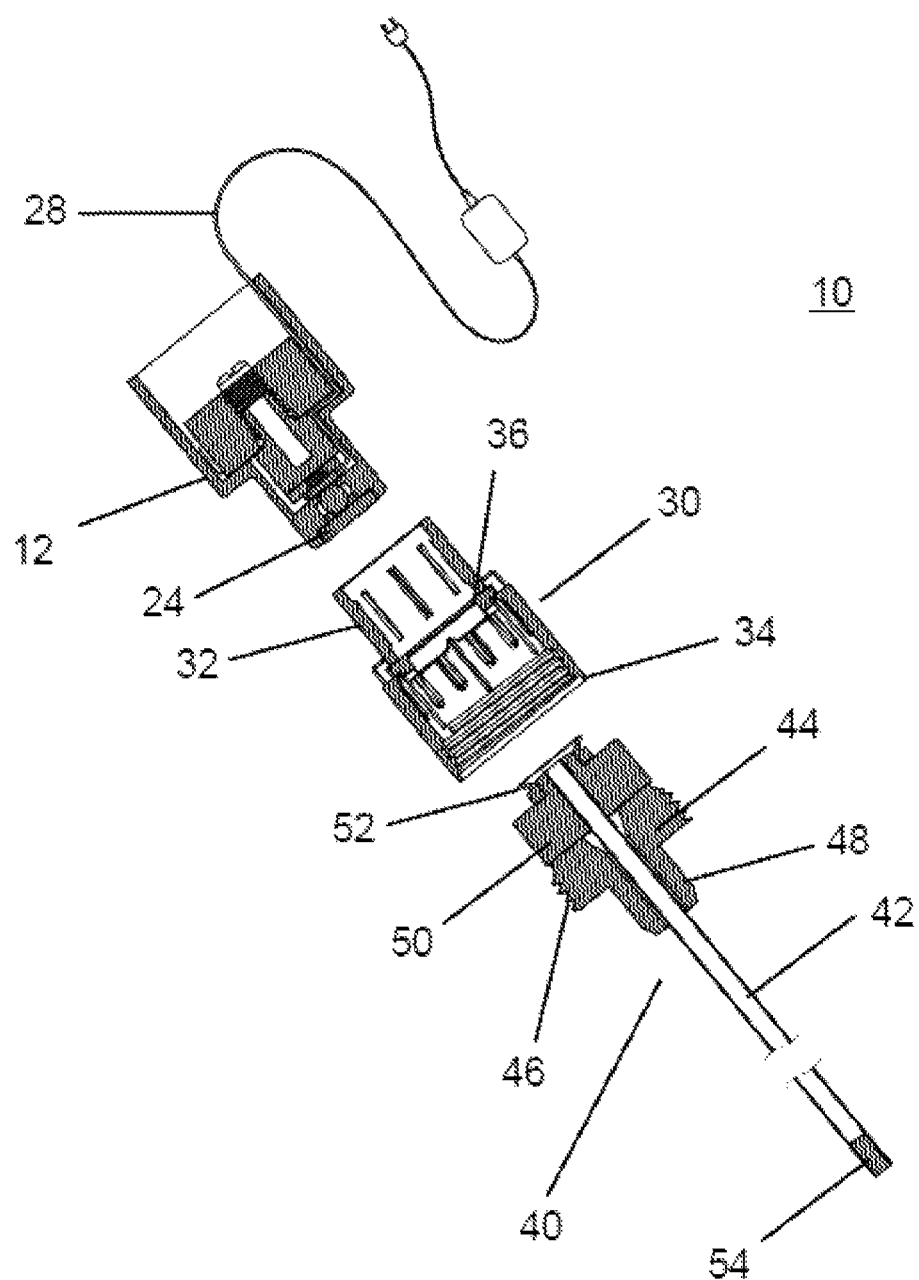
FIG. 2B is a cross-sectional view of the various parts of the assembly. In another embodiment (not shown here) the connector part 50 and the hollow threaded connector part 44 is moulded to form one unit. From this view, the window 24 of the light source assembly and the placement of the window 36 inside the coupling element is visible. When the three main parts (the light source assembly, the light coupling element, and the light guiding element) are connected to form one assembly, the two windows (24, 36) will be in close proximity to each other. Preferably, they will be in contact with each other. The gasket 52 will preferably be touching the window 36, or alternatively in close proximity to the window 36, when the three parts are connected to form one assembly. By having the two windows (24, 36) as well as the proximal end of the tube 42 in close vicinity to each other, the coupling loss of the light from the light source is minimized such that a larger percentage of the outputted light is transmitted to the liquid of the liquid filled tube 42. Furthermore, by having the gasket 52 engaging with the surface of the window 36, a predominantly watertight connection is formed.

The light guiding assembly preferably comprises a light coupling element 30 (as seen on e.g. FIG. 2B). The coupling element 30 preferably comprises a connector part 32 situated at the proximal end of the element and another coupling part 34, preferably situated at the distal end of the coupling element, said distal coupling part 34 preferably comprising an inner thread on at least a part of the inner surface. The proximal connector part 32 may be used for connecting a light source assembly thereto. The distal connector part is preferably used for attaching a light guiding element 40, e.g. through threaded engagement between an inner thread 34 of the distal connector and an outer thread 46 of the light guiding element. The light coupling element preferably further comprises a window 36, typically made of a polymer. The window may comprise a cyclic olefin copolymer (COC), which is transparent in the ultraviolet and visible spectral region. The thickness of the polymer window is preferably less than 5 mm, more preferably less than 3 mm, even more preferably less than 2 mm.

The light coupling element 30 is preferably made of a disposable polymer material. The window 36 is preferably made of a transparent polymer, which is transparent in the UVC spectral region. UVC transparent windows moulded in specific Cyclic Olefin Copolymers (COC) are examples of suitable windows.

Light Guiding Element

The light guiding assembly preferably comprises a light guiding element 40, typically further comprising a seal/gasket 52, a connector part 50, a tube 42, and a plug 54.

Seal/Gasket

The seal/gasket 52 is preferably situated at the proximal end of the light guiding element, and configured for engaging with the window 36 to form a leak-free connection at least under some conditions, e.g. under approximately atmospheric pressure. In other conditions, such as under pressures above atmospheric pressure, the gasket-window connection preferably allows some liquid to be expelled. Thus, the gasket preferably has an overflow functionality, which is controllable through the liquid pressure of a liquid inside the polymer tube 42. The seal/gasket may be any element, e.g. an O-ring or The light coupling element 30 is preferably made of a disposable polymer material, suitable for achieving the above purpose.

Thin Walled Tube

The light guiding element preferably comprises an elongated thin walled tube suitable for propagation of light, e.g. UV light, inside the tube, when the light guiding assembly is connected with a light source. Some of the light is preferably transmitted through the tube wall such that at least part of the light is emitted radially from the tube. In one embodiment, the thin walled tube is a liquid filled polymer tube. The material of the thin walled tube is preferably a fluoropolymer material such as Polytetrafluoroethylene (PTFE) or Fluorinated ethylene propylene (FEP).

The elongated thin walled tube is preferably filled with a liquid before it is used for disinfection purposes. Said liquid is preferably an ionic solution, even more preferably a transparent non-scattering ionic solution, typically comprising a sodium chloride solution or an equivalent ionic solution in concentrations up to 30-40%. Examples of other suitable ionic solutions include calcium chloride solutions and potassium chloride solutions. In one embodiment, the ionic solution is made of sodium chloride of high purity, preferably above 99%, and dissolved in deionized or distilled water. In case the ionic solution is a sodium chloride solution, the concentration of the sodium chloride solution may be between 5% and 26%.

The refractive index of the tube wall is preferably lower than the refractive index of the liquid, e.g. the ionic solution, contained inside the tube. When the refractive index of the ionic solution is slightly higher than the refractive index of the wall, the light from the light source propagates along the longitudinal direction of the tubular body and part of the light is transmitted through the tube wall along at least a part of the tubular body, which constitutes a versatile light source for light exposure. At least part of the light may be emitted through the tube wall along the length of the tubular body. The liquid filled polymer tube not only propagates light in the longitudinal direction towards the distal end but also make a radial light exposure along the total length of tubular body. To achieve the above purpose, the refractive index of the tube wall is preferably 1.30-1.35, and the refractive index of the ionic solution is preferably 1.33-1.38. The latter is adjustable by varying the concentration of the ionic solution. Suitable ionic solutions may have a concentration from approximately 5% up to saturation (typically 20-40%).

Figure 4:
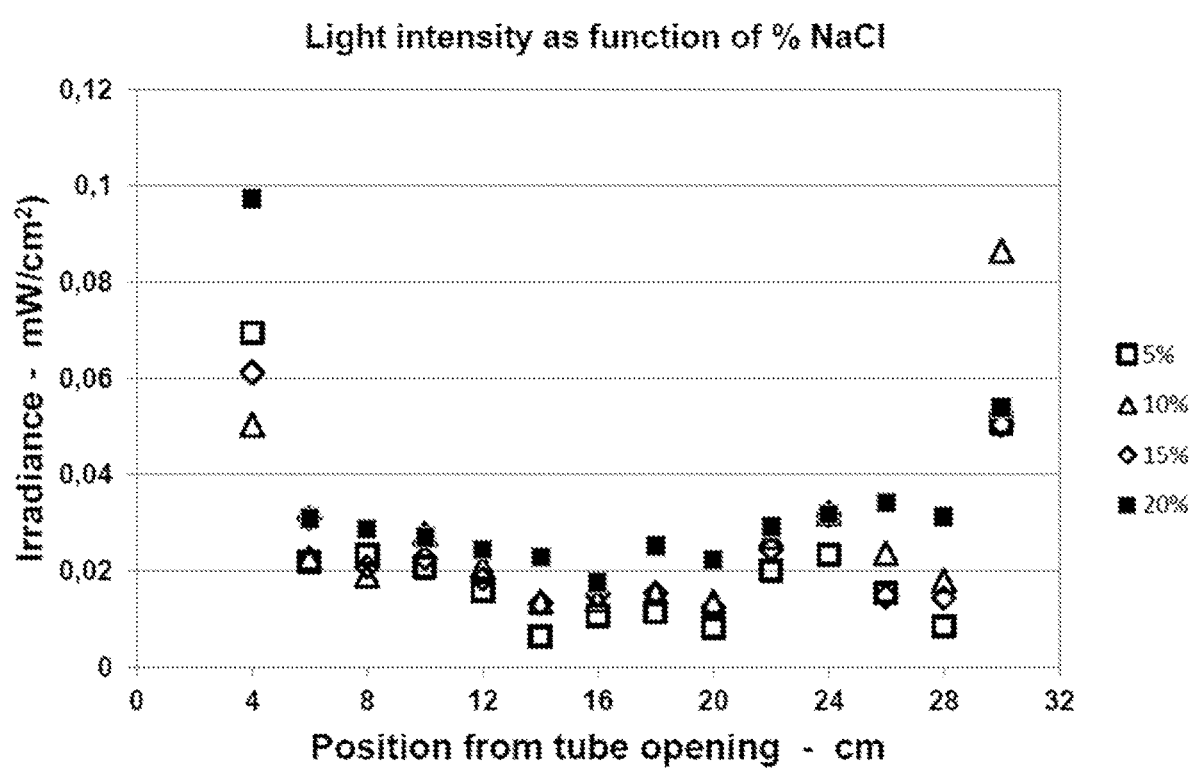
FIG. 4 shows the measured irradiance from the surface of the liquid filled polymer tube as a function of the concentration of the ionic solution. The various data series demonstrate the slight variation of the measured irradiance as a function of the concentration of the sodium chloride solution injected into the tubing. The data shown here is based on UVC light (approximately 275 nm) emitted from an LED. The tube used for this experiment is made of PTFE with an inner diameter of approximately 3 mm and a wall thickness of approximately 0.2 mm.

The thickness of the wall of the tube 42 is preferably less than 0.4 mm. The inner diameter of the polymer tube is preferably smaller than 5 mm. The elongated tube inserted into a medical tube is typically only partly transparent along the length of the tube. The tube used for the results shown in FIG. 4 is made of PTFE (e.g. Teflon®) with an inner diameter of approximately 3 mm and a wall thickness of approximately 0.2 mm.

Coupling Parts

The light guiding element preferably comprises a number of coupling parts and/or plugs. The coupling part 50 is typically placed in the proximal end of the tube 42 and it is preferably etched or welded to the tube, such that is does not move. Preferably, the light guiding element is provided with a moveable polymer coupling part 44 comprising a threaded section 46 in the proximal end and a hollow section for passage of the polymer tube. The moveable polymer coupling part in the proximal end may be provided with a threaded male part 46 for closure in the threaded female part 34 of the light coupling element.

In another embodiment, the moveable part constitutes a distal male coupling part, which is connectable to a female coupling part on a medical tube, wherein said medical tube has a diameter larger than the diameter of the light guiding element polymer tube. These coupling parts could be part of endotracheal and venous catheters.

In one embodiment, the distal closure 54 of the tube is a polymer plug, which is etched, welded or glued to the tube such it preferably constitutes a leak-free closure in the distal end of the tube 42. In another embodiment, the distal closure of the tube comprises a detachable connector part. In this embodiment, said detachable connector part is preferably attached to the tube before filling the tube with a liquid. Subsequent to filling the tube, the connector part may then be closed with a plug. The connector and plug in combination preferably forms a leak-free closure in the distal end of the tube. The connector and plug may then be removed before the light guiding element is used for disinfection purposes, e.g. by inserting the liquid filled tube into a patient's medical tube. The liquid preferably stays inside the tube of the light guiding element because of capillary forces on the liquid and/or surface tension of the liquid. This allows the light guiding element to be inserted into a patient's medical tube without losing any liquid inside e.g. the patient's lungs even though the liquid filled tube has an open distal end.

The light guiding assembly may be used in combination with other connector parts for coupling medicals devices to the light guiding assembly. One example of such a connector part is a three-way connector 62 for attaching a medical airway tube 60 and an airway tube 64 (see e.g. FIG. 6). The connector parts for connecting a medical device could be three-way connectors, T and Y-connectors or Luer catheter connectors. The connector part 48 is preferably suitable for connecting such external connector parts for coupling medicals devices to the light guiding assembly.

Propagation of Light

Typically, when the light guiding assembly is used in combination with a light source, the light rays enter the lumen of a tubular body of a medical device. The light will typically have a certain spread in angles. Light then travels towards the distal end of the tube and a part of the light will be propagating at angles that are non-parallel to the tube. When the light reaches the inner walls of the tube it may be reflected and/or transmitted (refracted) through the tube wall depending on the relative characteristics of the liquid and the tube wall. A part of the light may also be absorbed in the tube wall depending on the absorption and thickness of the tube wall.

The parameter determining the ratio between the reflected and the emitted light through the tube wall of 42 is the refractive index of the ionic solution and the tube wall material, particularly the ratio of the refractive indices of said liquid and said tube wall. If said ratio is close to 1, nearly all the light is emitted in the first few centimetres of the liquid filled polymer tube. If the concentration of the ionic solution is increased, a higher fraction of the light propagates to the far distal end of the tube 42 and the light is emitted from the elongated tube along its full length.

The propagation of light in the tube as described above is preferably supported both for visible and ultraviolet light. The ionic solution is preferably transparent and non-scattering and the relative refractive index is preferably approximately constant over a substantial part of the ultraviolet-visible spectrum.

Several parameters determine the level of irradiance from the liquid filled polymer tube 42. The relative refractive index between the polymer wall and the ionic solution is one parameter. The level of emitted light through the wall of the tube 42 also depends of the thickness of the tube wall.

Light Source Assembly

Figure 3:
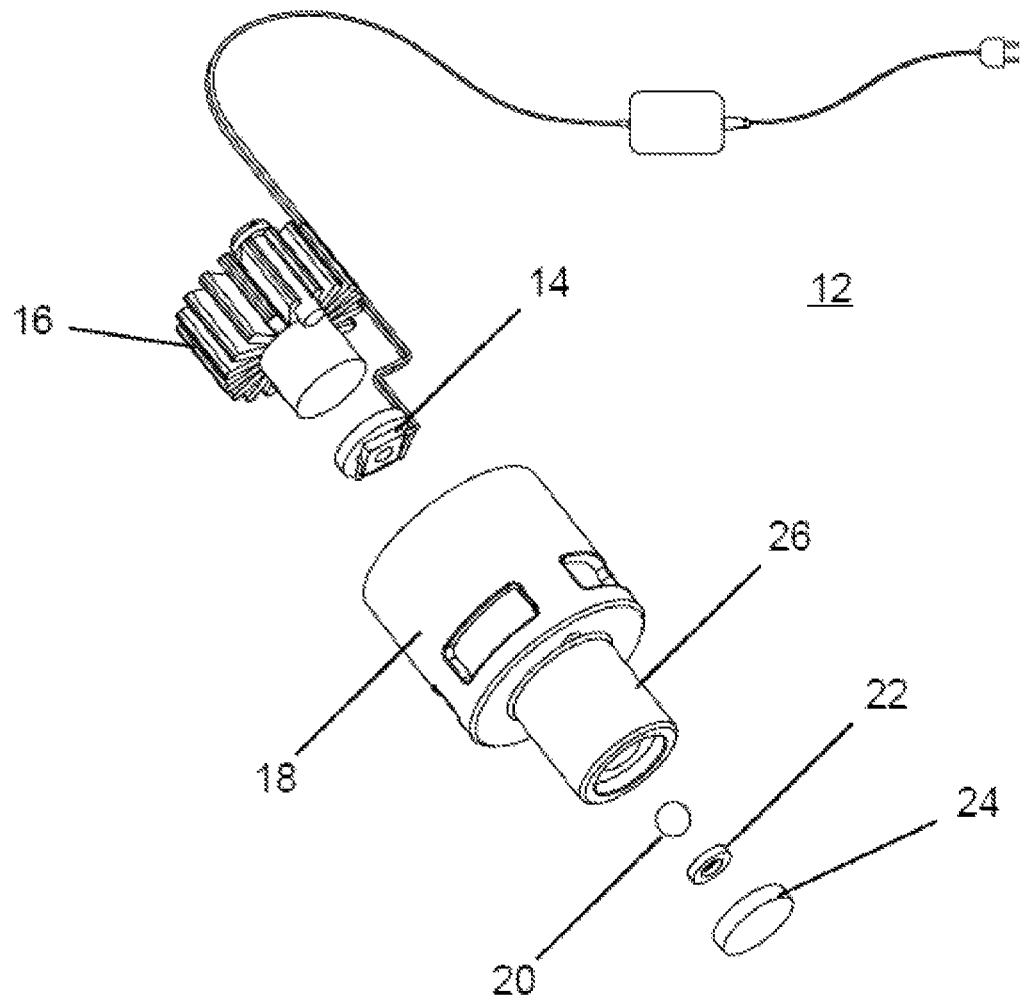
FIG. 3 is an exploded view of an exemplary light source assembly, which is compatible with the presently disclosed light guiding assembly. The light source assembly comprises a heat sink 16, a light source 14 such as an LED, a ball lens 20, a space 22, and a window 24; all contained in a housing 18. The window 24 is preferably made of quartz or fused silica.

The light guiding assembly is preferably suitable for use with a light source assembly, which can be connected to the light guiding assembly, e.g. using the light coupling element 30. The light source assembly typically comprises a light source 14, e.g. a light emitting diode (LED), one or more spacers 22, a lens 20 such as a ball lens, a window 24, and a heat sink 16, typically all encapsulated in a housing 18. A light source assembly according to one embodiment can be seen on FIG. 3.

The following is a description of an exemplary light source assembly, which is compatible with the presently disclosed light guiding assembly. According to this example, the light source assembly 12 comprises an LED 14. The LED chip size is approximately 1-2 mm². The heat developed by the LED is removed by a heat sink 16 in thermal contact with the LED. The heat sink, LED and electrical wires connected to an adapter are placed in a polymer housing 18 with air holes for ventilation. In this embodiment, a ball lens 20 is placed in close proximity to the LED chip and is kept in place by a polymer spacer 22. The light source is closed by a window 24 at its distal end. The focal length of the LED in combination with the ball lens is a few millimetres in front of the surface of the window 24. Minimizing the spot size is crucial in order to launch as much of the light power emitted into the opening of the liquid filled polymer tube 42 and consequently maximize the exposure of the inner surface of the medical tube systems.

The light source, e.g. the LED, used for UVC disinfection purposes preferably has wavelengths in the UVC spectral range, i.e. 250-280 nm. However, light sources with other wavelengths might also be used for disinfection purposes. UVB and UVB radiation are, however, less effective for disinfection purposes. LEDs emitting UVA, UVB and visible light could be a possible solution for disinfection if combined with photo-active coatings on the surfaces of medical tubes. The lens, e.g. the ball lens, has to be manufactured in a high quality UV graded quartz or fused silica in order to be sufficiently transparent in the UVC spectral range. In other spectral regions, common glasses such as BK7 can be used. The same requirements regarding quality applies for the window 24.

The distal part of the housing 18 is preferably formed as a cylindrical male connector part 26. This part preferably fits into the light coupling element 30, e.g. by engagement between the male connector part 26 and the female connector part 32. When the light source assembly 12 is connected to the light coupling element 30, the window 24 is preferably in close proximity to the polymer window 34 of the light coupling element, or even more preferably it is in direct contact with the polymer window 34. In this way the distance and angle of the light source is controlled such that the focal spot from the light source combined with the lens is minimized at the position of the surface of the polymer window 34.

The light source is preferably driven by an electrical power, in the case of an LED typically approximately using 3 W. The major part of the electrical power is often dissipated as heat. A heat sink may absorb and dissipate the heat to the environment through air holes in the housing 18. Features that control the operation of the light source, such as switching on and off the light source, can be placed in the adapter unit placed away from the light source. A light source assembly as described above is preferably made as lightweight as possible, which is an advantage when it is connected to the patient's medical tube.

In one embodiment, the light source is an LED emitting light in the range 250-600 nm. The lens may be a ball lens, preferably with a diameter less than 6 mm. In another embodiment, the optics, ball lens and window is made of fused silica.

Optical Fiber

The light guiding assembly may alternatively to the liquid filled polymer tube comprise an optical fiber light guide. The optical fiber is preferably made of a glassy material, such as UV grade quartz or fused silica. The fiber can preferably be connected to the light source 12 using the means described above. The optical fiber might be fastened and centred in the connector part 50 and forced up to the edge of the window 36. The optical fiber could be surface treated such that that there is a loss of light along the length of the fiber. The fiber could be protected by encapsulating it in a transparent polymer sleeve.

Assembling the Light Guiding Assembly

The parts of the light guiding assembly are preferably mounted in the following sequence: The threaded part 46 of the light guiding element 40 is mounted in the female threaded part 34 of the light coupling element, which preferably comprises a transparent polymer window 36. The connected light guiding element 40 and the light coupling element 30 is typically next connected to a light source assembly 12 by joining the female proximal part 32 of the light coupling element into the male part 26 of the light source assembly 12. The male connector part 48 may be manufactured to fit various medical tube connector parts such as those used in endotracheal tubes (ETTs) and Luer connectors on catheters. When assembled, the liquid filled polymer tube 42, the connector 50 and the gasket 52 is forced up against the polymer window 36 to create a predominantly watertight connection under atmospheric conditions. The liquid filled tube is in one embodiment closed in the distal end by a polymer plug 54, which is preferably welded, etched and glued into the tube opening to form a leak-free termination of the tube in the distal end. In another embodiment (not shown), the distal end of the tube 42 is equipped with a Luer like connector part kept in place by friction for filling of the liquid. This filling connector is preferably removed before the polymer tube 42 is inserted in the medical tube 60. Capillary forces on the liquid inside the tube will preferably ensure that the liquid stays inside the tube, despite the fact that the filling connector is removed before used. During operation, the light from the light source 14 is preferably in optical communication with the liquid filled polymer tube 42.

The liquid filled polymer tube 42 is preferably mounted in a fluoropolymer connector part 50, which fastens and centres the tube relatively to the light source 14. When all parts, the light source assembly 12, the light coupling element 30 and light guiding element 40 are assembled, the window 24 of the light source is preferably in contact with or in close proximity to the polymer window 36 of the light coupling element 30.

The threaded connector part 44 is preferably hollow such that there is a passage for the tube 42 such that the connector part 50 can engage with the proximal part of 44. When mounting the threaded part 44 into the light coupling element 30, the tube and the gasket is preferably forced up against the polymer window 36 in the light coupling element to create a watertight closure, or a nearly watertight closure, at least under atmospheric conditions.

Filling the Tube of the Light Guiding Element

The present disclosure further relates to a method of filling a polymer tube for light exposure of the interior of medical tubes. In one embodiment, the method begins with the step of closing the proximal end of the tube 42. In this method, the closing is done by connecting the proximal end of the tube to the light coupling element 30 such that the gasket 52 comes in direct contact with a polymer window 36 of the coupling element. The gasket and the polymer window in combination then preferably forms a predominantly leak-free connection once they are brought in close contact, and provided the system is under atmospheric conditions. The light coupling element and the light guiding element may be connected with each other through threaded engagement, e.g. through the threads 34 and 46. Subsequent to the closure of the proximal end of the tube, the distal end may be connected to a liquid source. In this embodiment, a connector part for connecting to a liquid source is fitted in the distal end of the tube. Accordingly, the distal end of the tube is open rather than closed off by a permanent plug (such a permanent plug 54 is shown in FIG. 2B). After connection to a liquid source, liquid is allowed to flow from said liquid source to the inside of the tube 42. The inside of the tube should preferably be entirely filled with the liquid, e.g. the ionic solution. In one embodiment, the volume of the liquid contained inside the tube corresponds to approximately 1.5 millilitres. Once the tube is completely filled or nearly completely filled with the liquid, excess liquid is allowed to flow out of the tube through the proximal end. This is possible because the gasket-window connection allows some liquid to be expelled, provided the liquid pressure is sufficiently high. Thus, the gasket features an overflow functionality, which is controllable by the liquid pressure. Once the inner of the tube is completely filled, the assembly may be disconnected from the liquid source and the distal end of the tube may be closed with a distal closure that preferably fits in the connector part. As an example, the tube may be closed by inserting a polymer plug in the connector part at the distal end of the tube.

Another method of filling the polymer tube comprises first the step of inserting through the proximal end of the tube a filling needle, wherein said filling needle is in fluid connection with a liquid source. In this embodiment, the light guiding element comprises a distal closure, e.g. a welded plug in the distal end of the polymer tube, such that the distal end of the tube is closed. The filling needle may extend all the way from the proximal end of the tube to the distal end of the tube. Liquid may then be allowed to flow from the liquid source to the inside of the tube through the filling needle. The filling needle may be moved in a backwards motion from the distal end of the tube 42 to the proximal end of the tube 42 while the filling takes place. Once the inside of the tube is completely filled with the liquid, the filling needle is preferably removed from the tube. Then the proximal end of the tube may be closed, e.g. by connecting the proximal end of the tube to the light coupling element 30. The gasket 52 will then seal the tube 42 once the gasket comes in contact with the window 36 of the coupling element 30, as previously explained.

Examples

FIG. 4 shows the measured irradiance from the surface of the liquid filled polymer tube as a function of the concentration of the ionic solution. The various curves demonstrate the slight variation of the measured irradiance as a function of the concentration of the sodium chloride solution injected into the tubing. An increase of irradiance along the length of the tube is observed when the concentration of the sodium chloride solution is raised from 5% to 20%. The phenomenon shown in FIG. 4 is not limited by the inner diameter of the PTFE or FEP tubes. Tubes with higher and lower inner diameters than 3 mm provide similar results (not shown here). Inner diameters from sub millimeter to several millimeters are suitable. In this way, the liquid filled polymer tube can be tailored to specific medical applications. The data shown in FIG. 4 is based on UVC light (approximately 275 nm) emitted from an LED. The phenomenon is not limited to the UVC spectral region as described earlier. The slight difference between the refractive index of for example PTFE and FEP fluoropolymer tubes and the ionic solution produces similar results in the UVB, UVA and visible spectral region. Therefore, the liquid filled polymer tube constitutes a versatile means for illuminating the inner surfaces of for instance medical tubing. Applications are typically direct disinfection with ultraviolet light, for instance UVC light or ultraviolet or visible light in combination with photoactive coatings. FIG. 4 also shows that a substantial loss of light is lost during the first few centimeters when launching the light into the liquid filled polymer tube. An LED based light source with a ball lens was used here. Much of the light enters the tube with an angle smaller than the critical angle given by the refractive ratio between the wall material and the sodium chloride solution. A loss observed as a higher level of irradiance is also observed at the end of the tube. This is caused by Fresnel reflections between the liquid-air boundary. The irradiance curve measured at the surface of the Teflon® tube appears to be non-uniform. Calculations of the light dosages necessary for disinfection have to take into account this irradiance profile. This also counts for the use of an optical fiber. With available LED light sources, there is a high loss when light is launched into a much narrower optical fiber compared to the millimeter opening of the Teflon® tube described above.

Figure 5:
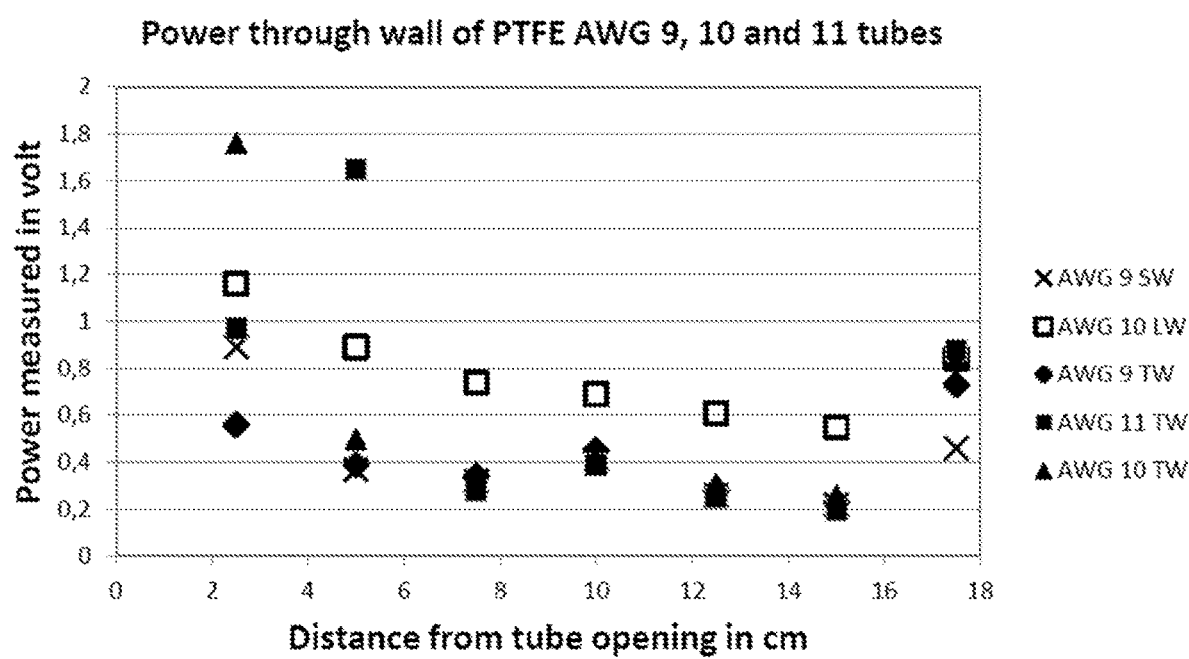
FIG. 5 demonstrates the influence of the wall thickness on the level of emitted 275 nm UVC light along the full length of the tube 42. Wall thicknesses between 0.2-0.4 mm of PTFE tubes results in different levels of light emitted through the wall Thinner walls transmit a higher level of UVC light compared those with a thicker wall. A standard wall (SW) is approximately 0.4 mm in thickness, a thin wall (TW) is approximately 0.3 mm and a light wall (LW) is approximately 0.2 mm. The inner diameter of the tubes shown here are between 2.4-3.0 mm.

FIG. 5 demonstrates the influence of the wall thickness on the level of emitted 275 nm UVC light along the full length of the tube 42. Wall thicknesses between 0.2-0.4 mm of PTFE tubes results in different levels of light emitted through the wall Thinner walls transmit a higher level of UVC light compared those with a thicker wall. A standard wall (SW) is approximately 0.4 mm in thickness, a thin wall (TW) is approximately 0.3 mm and a light wall (LW) is approximately 0.2 mm. The inner diameter of the tubes shown here are between 2.4-3.0 mm.

Figure 6:
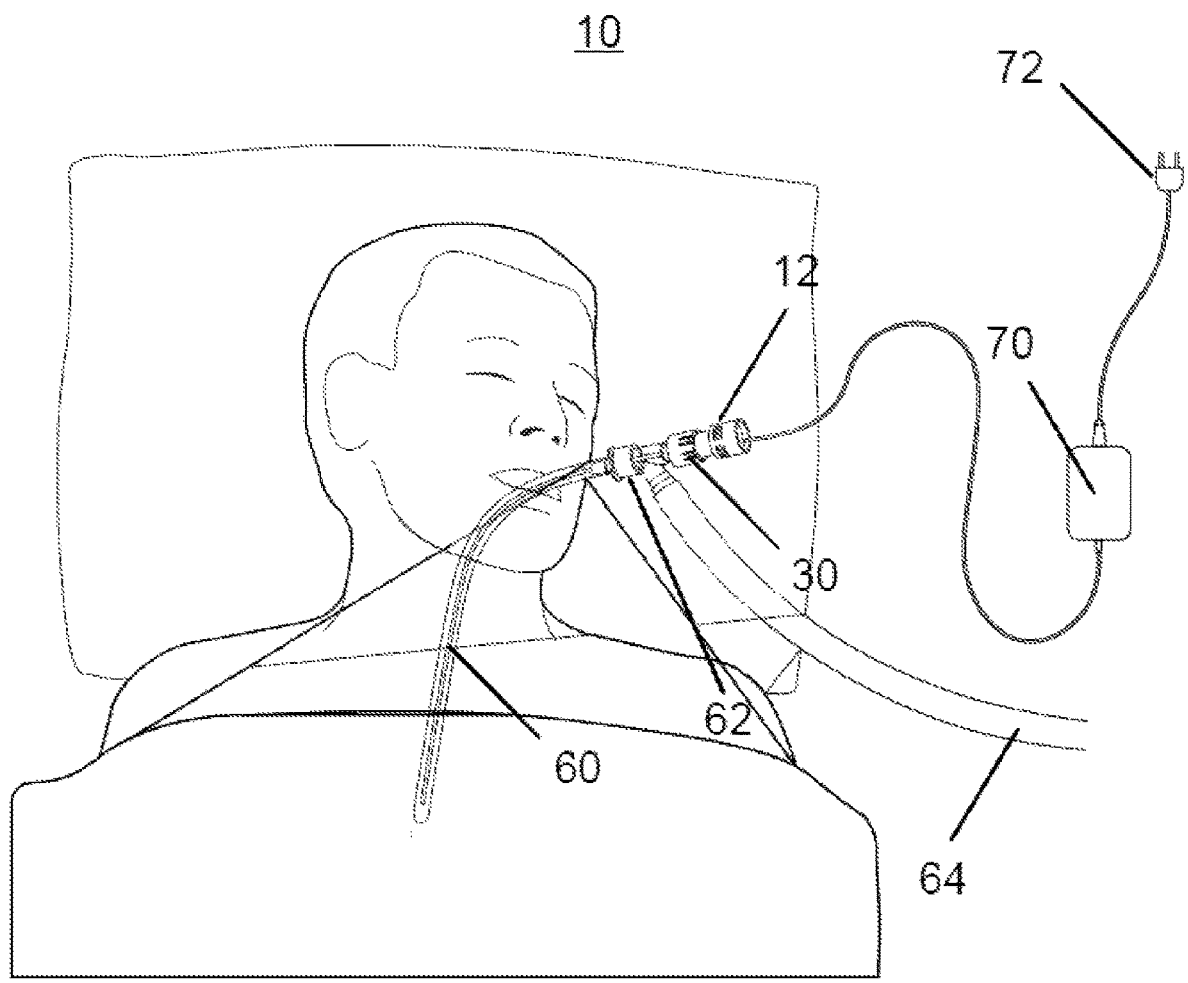
FIG. 6 illustrates the use of the light guiding assembly for exposing the lumen of a patient's endotracheal (ET) tube 60. The assembly is interfaced to the ET tube via a three-way connector part 62, which is in fluid communication with a ventilator (not shown) via a ventilator tube 64. A light source is connected to the three-way connector via the light coupling element 30, which fits into the axial port of the three-way connector piece.

FIG. 6 illustrates the use of the light guiding assembly for exposing the lumen of a patient's endotracheal (ET) tube 60. The assembly is interfaced to the ET tube via a three-way connector part 62, which is in fluid communication with a ventilator (not shown) via a ventilator tube 64. A light source is connected to the three-way connector via the light coupling element 30, which fits into the axial port of the three-way connector piece. The light source 12 is powered up by approximately 7-10 V that is delivered by mains 72 via the adapter 70. The operational mode of the assembly depends on the intended use of the assembly. One advantageous mode of operation is with UVC light for direct disinfection of the inner surfaces of an endotracheal (ET) tube. It is established experimentally and with examination of several ET tubes that a biofilm forms at the inner surface of the ET tube within 24 hours. Therefore, the assembly should preferably be used with a UVC light source twice a day in order to prevent biofilm to form in the ET tube. The ET tube is preferable made of poly vinyl chloride polymer (PVC) with a wall thickness of at least 1 mm. The PVC material with this thickness is non-transparent for UVC light. No unintended exposure of the tissue of the patient then takes place. All UVC light emitted along the liquid filled polymer tube is confined to the ET tube lumen. The liquid filled polymer tube inserted into the ET and the light coupling element are preferably disposable components. The light source assembly including the light source can preferably be used multiple times.

Another possible application is to use the fact that light at other wavelengths are propagated easily well along the liquid filled polymer tube and emitted along its length. UVA light with wavelengths close to 400 nm (UVA—blue light) can assist chemical reactions on surfaces with photoactive coatings. One known example is fine titanium dioxide ($TiO_2$) particles deposited on a surface reacting with UVA light in humid environments. Then $TiO_2$ acts a photo catalyst generating very reactive OH radicals, which can destroy organic matter and disinfect surfaces. Other photo catalysts combined with light with the appropriate wavelength may be used as well. The proper manufacture of the ET tube (or catheter) with a photoactive coatings on both sides and the transparency of the medical tube at near visible wavelengths could support disinfection on both the inner and outer surface of the medical tubes.

There are some restrictions with the use of the liquid filled polymer tube in ET tubing. The outer diameter of the liquid filled polymer tube should preferably be less than ½-⅓ of the inner diameter of the ET tube when used for a shorter period of time. The inner diameter of the ET tubes is typically in the range from 6.5 mm (female) and up to 10 mm (male). This suggests that the outer diameter of the liquid filled polymer tube should be in the range 2-4 mm.

Figure 7:
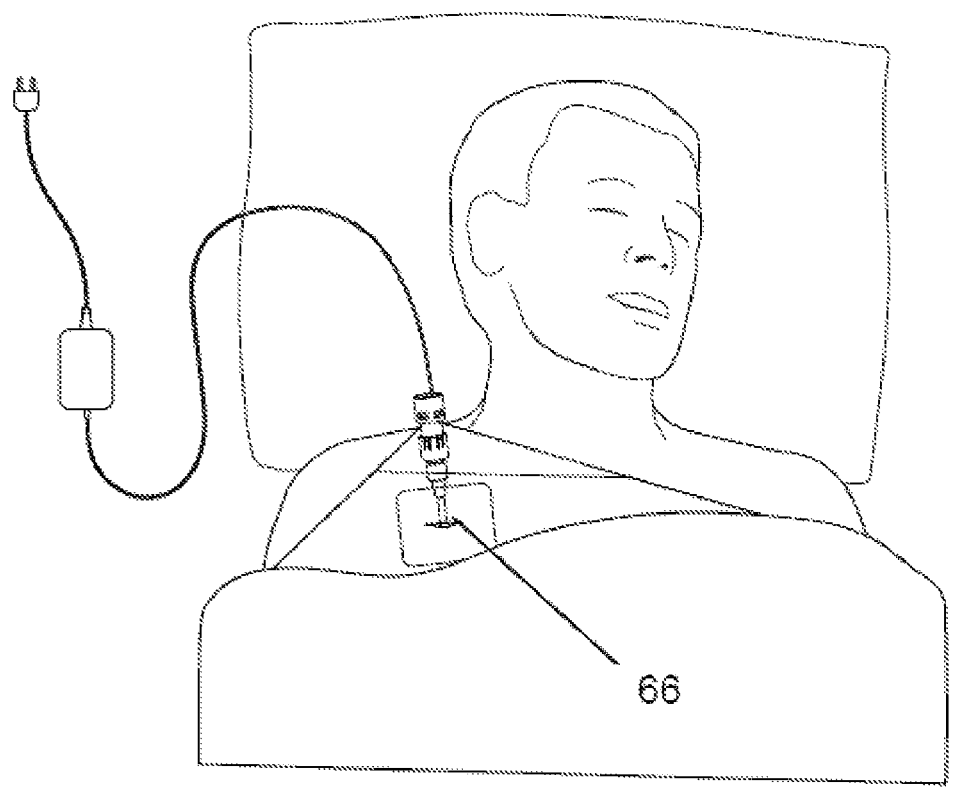
FIG. 7 displays the use of the light guiding assembly for disinfecting the lumen of a venous catheter. The diameter of the liquid filled polymer tube used for this purpose must be relatively small since the inner diameter of a venous catheter is smaller than the inner diameter of e.g. the endotracheal tube shown in FIG. 6.

Another application is for UVC disinfection of the lumen of catheters particularly venous catheters as shown schematically in FIG. 7. The diameter of the liquid filled polymer tube used for this purpose must be relatively small because the inner diameter of a venous catheter is smaller than the inner diameter of the ET tube. Typically, the inner diameter of the ex-vivo part of a venous catheter is 3 mm. One advantage here is that the length of the ex-vivo parts of a venous catheter is very short compared to the ET tube. It is shown in FIG. 4 that the irradiance from the liquid filled polymer tube surface is very high along the first 4 cm of the tube. The disinfection efficacy of the Luer connector parts and the inner parts of the ex-vivo catheter tube will typically be very high. The UVC light exposure time could then be limited to a very short time. The flushing of catheters with a saline solution (0.9%) is a standard procedure. This solution is UVC transparent and disinfection could then take place before the saline solution is replaced with a catheter lock solution.

When the presently disclosed light guiding assembly is used with for example a venous catheter there might be an issue with liquid outflow from the venous catheter, which while inserted in a patient is submitted to a slight overpressure such that saline, blood, etc., can only exit the patient and not unwantedly enter the patient. I.e. when the presently disclosed light guiding assembly is inserted in a venous catheter for UV treatment it might be necessary to ensure that the connection between the light guiding assembly and the venous catheter is liquid tight, i.e. such that liquid exiting the catheter does not pass through the light guiding assembly. When used with a venous catheter it can also be necessary that the engagement between light guiding assembly and catheter is secure, i.e. is kept safely in place.

Figure 8:
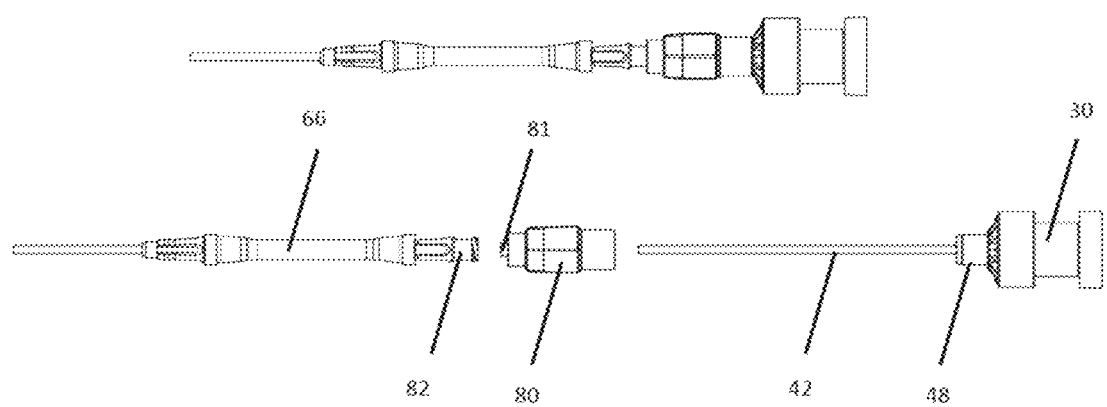
FIG. 8 displays the presently disclosed light guiding assembly coupled and secured to a venous catheter via a catheter adapter that provides for leak free engagement between the presently disclosed assembly and the venous catheter.

FIG. 8 displays an example of a solution to these issues, where the presently disclosed light guiding assembly is coupled and secured to a venous catheter via a catheter adapter that provides for liquid tight engagement between the assembly and the venous catheter via a seal in the catheter adapter that engages with the polymer tube of the assembly.

Hence, in a further embodiment the presently disclosed light guiding assembly comprises an (catheter) adapter for engagement between a medical device having an elongated lumen, such as a catheter, and the connector part, to allow for insertion of the liquid filled polymer tube into the medical tube, such as a catheter lumen. The adapter may comprise a proximal end configured to engage with a distal end of the connector part. The catheter adapter may further comprise a distal connector, such as a Luer connector, configured to engage with (and lock to) a corresponding connector on the medical device. E.g. the distal connector of the adapter may comprise at least one thread for threaded engagement with a corresponding thread on the medical device. The adapter may comprise a seal/gasket configured for closing and/or sealing the interface (i.e. the void) between the adapter and the liquid filled polymer tube upon engagement there between such that the proximal opening of the medical tube is liquid tight and leak free.

FIG. 8 shows the connector part 48 coupled to the venous catheter 66 via a venous catheter adapter 80. The adapter 80 has in the distal end part a conical shaped male taper 81, which fits into the Luer female part 82 of the venous catheter 66. The distal end of the catheter adapter 80 also comprises a threaded part which fits a treaded part of the venous catheter Luer connector. In this way the catheter adapter 80 is secured to the venous catheter 66. During disinfection of the venous catheter 66 the liquid filled tube 42 is inserted into the venous catheter 66 via the catheter adapter 80. A seal is part of the catheter adapter 80 in order to keep the closure between the connector part 48 and the catheter adapter 80 leak free. During disinfection the liquid filled tube 42 is inserted partly into the ex-vivo tube part of the venous catheter 66 through a distal opening hole of the Luer connector part 82. As soon as the liquid filled polymer tube enter the catheter adapter the seal engages the polymer tube and the connection is leak free such that the catheter can be further inserted. Alternatively the liquid filled tube 42 may be inserted into the full length of the venous catheter 66. After UV treatment of the lumen and inner surfaces of the venous catheter, i.e. disinfection, the connector part 48 and the catheter adapter 80 can be removed and substituted by a closure cap or stay in place after removal of the UV light source.

Instead of having separate parts in the form of connector part 48 and catheter adapter 80, the connector part 48 and the catheter adapter 80 may be formed as one unit—possible also formed integrally with the light coupling element. Hence, in another embodiment (not shown) the catheter adapter 80, the liquid filled tube 42 and the connector part 48 and optionally also the light coupling element 30 is one entity.

Hence, the connector part may be configured for secure connection with a proximal end of a venous catheter having a lumen. In that regard he connector part may comprise an internal seal, such as a (rubber) gasket, such as a central circular gasket, configured for sealing the interface (i.e. the void) between the liquid filled polymer tube and the lumen of the venous catheter such that a leak free/liquid tight connection is provided between the venous catheter and the assembly. The connector part may comprise a distal connector, such as a Luer connector, configured to engage with and secure to a corresponding proximal connector on the venous catheter. The distal connector of the connector part may comprise at least one thread for threaded engagement with the venous catheter. I.e. the features described above in connection with FIG. 8 for the catheter adapter 80 may apply to an embodiment where the connector part 48 and the catheter adapted is formed as one unit, possibly also formed integrally with the light coupling element—and vice versa.

When the liquid filled tube is inserted into a venous catheter 66, the combined entity (connector part 48+catheter adapter 80) can be locked to the catheter Luer connector and subsequently the light source can be mounted on the proximal end of the light coupling element 30. After UV treatment of the catheter lumen and inner surfaces the light source can be removed. The entity comprising a liquid filled light guide, connector part 48 and light coupling element 30 with optical window is fastened on the catheter Luer connector until the venous catheter 66 is processed again. In this way there is no need for a catheter cap for catheter closure.

Items

1. A light guiding assembly for light exposure inside a medical tube comprising:
   a) a light guiding element comprising:
      a liquid filled polymer tube; preferably having an at least partly transparent tube wall,
      a distal closure at the distal end of said tube;
      a proximal closure comprising a gasket with overflow functionality at the proximal end of said tube; and
   b) a light coupling element comprising
      a window,
      a distal end configured for engagement with the proximal closure such that the gasket seals the liquid filled polymer tube, and
      a proximal end for engagement, preferably configured for mechanical engagement, with a light source (assembly) such that light can be guided into the liquid filled polymer tube and preferably emitted radially through the transparent tube wall along a substantial length of the tube.
2. The assembly according to item Error! Reference source not found., wherein the distal closure of the polymer tube comprises a detachable connector part for connecting the light guiding assembly to a liquid source.
3. The assembly according to any of the preceding items, wherein the distal closure of the polymer tube comprises a polymer plug.
4. The assembly according to item Error! Reference source not found., wherein the distal closure, or at least a part of it, is permanently secured to the tube, e.g. by welding, etching or by the use of adhesive.
5. The assembly according to item Error! Reference source not found., wherein the distal closure is removable and wherein the liquid stays inside the liquid filled polymer tube as a result of capillary forces, once the distal closure is removed.
6. The assembly according to any of the preceding items, wherein the proximal end of the light guiding element is configured for connecting the light guiding element to the light coupling element.
7. The assembly according to any of the preceding items, wherein the distal closure of the polymer tube comprises a connector part for connecting the light guiding assembly to a liquid source.
8. The assembly according to any of the preceding items, wherein the distal end of the polymer tube comprises a Luer connector, e.g. a Luer lock fitting.
9. The assembly according to any of the preceding items, wherein the distal closure of the polymer tube comprises a detachable connector part.
10. The assembly according to any of the preceding items, wherein the distal closure of the polymer tube comprises a polymer plug.
11. The assembly according to any of the preceding items, wherein the distal closure of the polymer tube comprises a polymer plug, which is etched, welded or glued to the tube.
12. The assembly according to any of the preceding items, wherein the liquid and the polymer tube wall are configured to allow propagation of light inside the tube and to allow some transmittance of light through the tube wall.
13. The assembly according to any of the preceding items, wherein the refractive index of the material of the tube wall is lower than the refractive index of the liquid inside the tube.
14. The assembly according to any of the preceding items, wherein the refractive index of the tube wall is n1 and the refractive index of the liquid is n2 and n1/n2<1 so that light from the light source travels along the longitudinal direction of the tubular body and that a part of the light is emitted through the tube wall along at least a part of the tubular body.
15. The assembly according to any of the preceding items, wherein the refractive index of the material constituting the tube wall is between 1.30 and 1.35.
16. The assembly according to any of the preceding items, wherein the refractive index of the liquid inside the tube is between 1.33 and 1.38.
17. The assembly according to any of the preceding items, wherein the window of the light coupling element is in close proximity to a window of a light source assembly.
18. The assembly according to any of the preceding items, wherein the window of the light coupling element comprises a polymer.
19. The assembly according to any of the preceding items, wherein the window comprises a cyclic olefin copolymer (COC).
20. The assembly according to any of the preceding items, wherein the thickness of the window is less than 5 mm.
21. The assembly according to any of the preceding items, wherein the thickness of the window is less than 3 mm.
22. The assembly according to any of the preceding items, wherein the thickness of the window is less than 2 mm.
23. The assembly according to any of the preceding items, wherein the material of the polymer tube is a fluoropolymer material such as Polytetrafluoroethylene (PTFE) or Fluorinated ethylene propylene (FEP).
24. The assembly according to any of the preceding items, wherein the thickness of the wall of the polymer tube is between approximately 0.2 mm and approximately 0.4 mm.

25. The assembly according to any of the preceding items, wherein the thickness of the wall of the polymer tube is less than 0.4 mm.
26. The assembly according to any of the preceding items, wherein the inner diameter of the polymer tube is less than 5 mm.
27. The assembly according to any of the preceding items, wherein the inner diameter of the polymer tube is between 2.4 mm and 3.0 mm.
28. The assembly according to any of the preceding items, wherein the housing of the light coupling element is made of a disposable polymer material.
29. The assembly according to any of the preceding items, wherein the light coupling element is internally threaded on at least a part of the inner surface.
30. The assembly according to any of the preceding items, wherein the gasket is a V-ring.
31. The assembly according to any of the preceding items, wherein the gasket is an O-ring.
32. The assembly according to any of the preceding items, wherein the light guiding element is provided with a moveable polymer coupling part.
33. The assembly according to any of the preceding items, wherein the light guiding element is provided with a coupling part, which is etched or welded to the proximal end of the polymer tube.
34. The assembly according to any of the preceding items, wherein the light guiding element is provided with a coupling part, which is connectable to a coupling part on a medical tube.
35. The assembly according to any of the preceding items, wherein the assembly is connected to an endotracheal (ET) tube via a three-way connector part.
36. A method of filling a polymer tube for light exposure of medical tubes, the method comprising the steps of:
   c) closing the proximal end of the tube, e.g. by connecting the proximal end of the tube to a light coupling element;
   d) connecting the distal end of the tube to a liquid source;
   e) allowing a liquid to flow from said liquid source to the inside of the tube;
   f) allowing excess liquid to flow out of the tube through the proximal end;
   g) disconnecting the tube from the liquid source, once the inner of said tube is completely filled with the liquid;
   h) closing the distal closure in the distal end of said tube, once the liquid source is removed from the distal end.
37. A method of filling a polymer tube for light exposure of medical tubes, the method comprising the steps of:
   i) inserting through the proximal end of the tube a filling needle, said filling needle being in fluid connection with a liquid source;
   j) allowing a liquid to flow from the liquid source to the inside of the tube through the filling needle;
   k) removing the filling needle from the tube, once the inner of the tube is completely filled with the liquid;
   l) closing the proximal end of the tube, e.g. by connecting the proximal end of the tube to a light coupling element.
38. The method according to item 37, wherein the filling needle extends to the distal end of the polymer tube.
39. The method according to item 37, wherein the end of the filling needle is moved from the distal end of the tube towards the proximal end of the tube simultaneously with the liquid filling of the tube.
40. The method according to any of the preceding items, wherein the liquid comprises an ionic solution.
41. The method according to any of the preceding items, wherein the liquid comprises a transparent non-scattering ionic solution.
42. The method according to any of the preceding items, wherein the liquid comprises a sodium chloride solution.
43. The method according to any of the preceding items, wherein the ionic solution is a sodium chloride solution of high purity, preferably above 99%, and wherein the sodium chloride is dissolved in deionized or distilled water.
44. The method according to any of the preceding items, wherein the liquid comprises a sodium chloride solution, wherein the concentration of the sodium chloride solution is between 5 and 26%.
45. The method according to any of the preceding items, wherein the liquid comprises a calcium chloride solution.
46. The method according to any of the preceding items, wherein the liquid comprises a potassium chloride solution.
47. A method of filling a polymer tube for light exposure inside a medical tube, wherein said polymer tube comprises an open distal end, the method comprising the steps of:
   a) closing the proximal end of the polymer tube, e.g. by connecting the proximal end of the polymer tube to a light coupling element;
   b) connecting a connector part of the distal end of the polymer tube to a liquid source;
   c) allowing a liquid to flow from said liquid source to the inside of the polymer tube;
   d) allowing excess liquid to flow out of the polymer tube through the proximal end;
   e) disconnecting the polymer tube from the liquid source, once the inner of said polymer tube is completely filled with the liquid;
   f) closing the connector part in the distal end of said polymer tube, once the liquid source is removed from the distal end.
48. A method of filling a polymer tube for light exposure inside a medical tube, wherein said polymer tube comprises a closed distal end, the method comprising the steps of:
   a) inserting through the proximal end of the polymer tube a filling needle, said filling needle being in fluid connection with a liquid source;
   b) allowing a liquid to flow from the liquid source to the inside of the polymer tube through the filling needle;
   c) removing the filling needle from the polymer tube, once the inner of the polymer tube is completely filled with the liquid;
   d) closing the proximal end of the polymer tube, e.g. by connecting the proximal end of the polymer tube to a light coupling element.

The invention claimed is:
1. A method of filling a polymer tube for light exposure inside a medical tube, wherein said polymer tube comprises a closed distal end, the method comprising the steps of:
   a) inserting through the proximal end of the polymer tube a filling needle, said filling needle being in fluid connection with a liquid source;

b) allowing a liquid to flow from the liquid source to the inside of the polymer tube through the filling needle;

c) removing the filling needle from the polymer tube, once the inner of the polymer tube is completely filled with the liquid;

d) closing the proximal end of the polymer tube, wherein the filling needle extends to the distal end of the polymer tube prior to the filling, and wherein the end of the filling needle is moved from the distal end of the polymer tube towards the proximal end of the polymer tube simultaneously with the liquid filling of the polymer tube.

2. The method according to claim 1, wherein the proximal end of the polymer tube is closed by connecting the proximal end of the polymer tube to a light coupling element.

3. The method according claim 1, wherein the liquid comprises an ionic solution.

4. The method according to claim 1, wherein the liquid comprises a transparent non-scattering ionic solution.

5. The method according to claim 1, wherein the liquid comprises a sodium chloride solution.

6. The method according to claim 1, wherein the ionic solution is a sodium chloride solution of high purity, and wherein the sodium chloride is dissolved in deionized or distilled water.

7. The method according to claim 6, wherein the sodium chloride solution has a purity above 99%.

8. The method according to claim 1, wherein the liquid comprises a sodium chloride solution, wherein the concentration of the sodium chloride solution is between 5% and 26%.

9. The method according to claim 1, wherein the liquid comprises a calcium chloride solution.

10. The method according to claim 1, wherein the liquid comprises a potassium chloride solution.

\* \* \* \* \*